United States Patent [19]
Reed et al.

[11] Patent Number: 5,248,508
[45] Date of Patent: Sep. 28, 1993

[54] HARD COATED GUM WITH IMPROVED SHELF LIFE

[75] Inventors: Michael A. Reed, Evanston; Jeffrey S. Hook, Palos Hills, both of Ill.

[73] Assignee: Wm. Wrigley Jr. Company, Chicago, Ill.

[21] Appl. No.: 855,251

[22] Filed: Mar. 23, 1992

[51] Int. Cl.$^5$ .............................. A23G 3/30
[52] U.S. Cl. ...................... 426/5; 426/658; 426/302
[58] Field of Search ......................... 426/3-6, 426/548, 804, 302

[56] References Cited

U.S. PATENT DOCUMENTS

| | | |
|---|---|---|
| 4,117,173 | 9/1978 | Schiwek et al. ............ 426/548 |
| 4,317,838 | 3/1982 | Cherukuri et al. .............. 426/5 |
| 4,323,588 | 4/1982 | Vink et al. .................. 426/564 |
| 4,359,531 | 11/1982 | Bucke et al. ................. 435/97 |
| 4,423,086 | 12/1983 | Devos et al. ................. 427/3 |
| 4,567,053 | 1/1986 | Lindley ...................... 426/538 |
| 4,587,119 | 5/1986 | Bucke et al. ................. 424/48 |
| 4,693,974 | 9/1987 | Schwengers et al. ............ 435/97 |
| 4,792,453 | 12/1988 | Reed et al. .................. 426/5 |
| 4,961,935 | 10/1990 | Cherukuri et al. ............. 426/3 |
| 5,087,460 | 2/1992 | Cherukuri et al. ............. 426/5 |
| 5,135,761 | 8/1992 | Dave ......................... 426/5 |

FOREIGN PATENT DOCUMENTS

| | | |
|---|---|---|
| 0273000 | 6/1988 | European Pat. Off. . |
| 0328849 | 8/1989 | European Pat. Off. . |
| WO89/03170 | 4/1989 | PCT Int'l Appl. . |
| WO90/06061 | 6/1990 | PCT Int'l Appl. . |

OTHER PUBLICATIONS

Brochure: "Palatinit Infopac", Sussungsmittel GmbH (1984).
Brochure: "Methods Of Application 3.6.0.1", date of publication unknown.

*Primary Examiner*—Jeanette Hunter
*Attorney, Agent, or Firm*—Willian Brinks Olds Hofer Gilson & Lione

[57] ABSTRACT

A hard coated chewing gum is provided which exhibits improved long-term shelf stability under storage conditions involving constant exposure to the moisture contained in the atmosphere. The hard coated chewing gum is ideally suited for pellet chewing gum having pellet shapes which cannot easily be protected from atmospheric moisture by packaging. The hard coated chewing gum has a gum center which includes a gum base, a bulk portion, and one or more flavoring agents. The gum center contains at least 2.5% moisture and not more than 3.0% glycerin. The hard coated chewing gum also has an outer coating which includes about 50 to about 100% hydrogenated isomaltulose. A method of preparing the hard coated chewing gum is also provided.

28 Claims, 1 Drawing Sheet

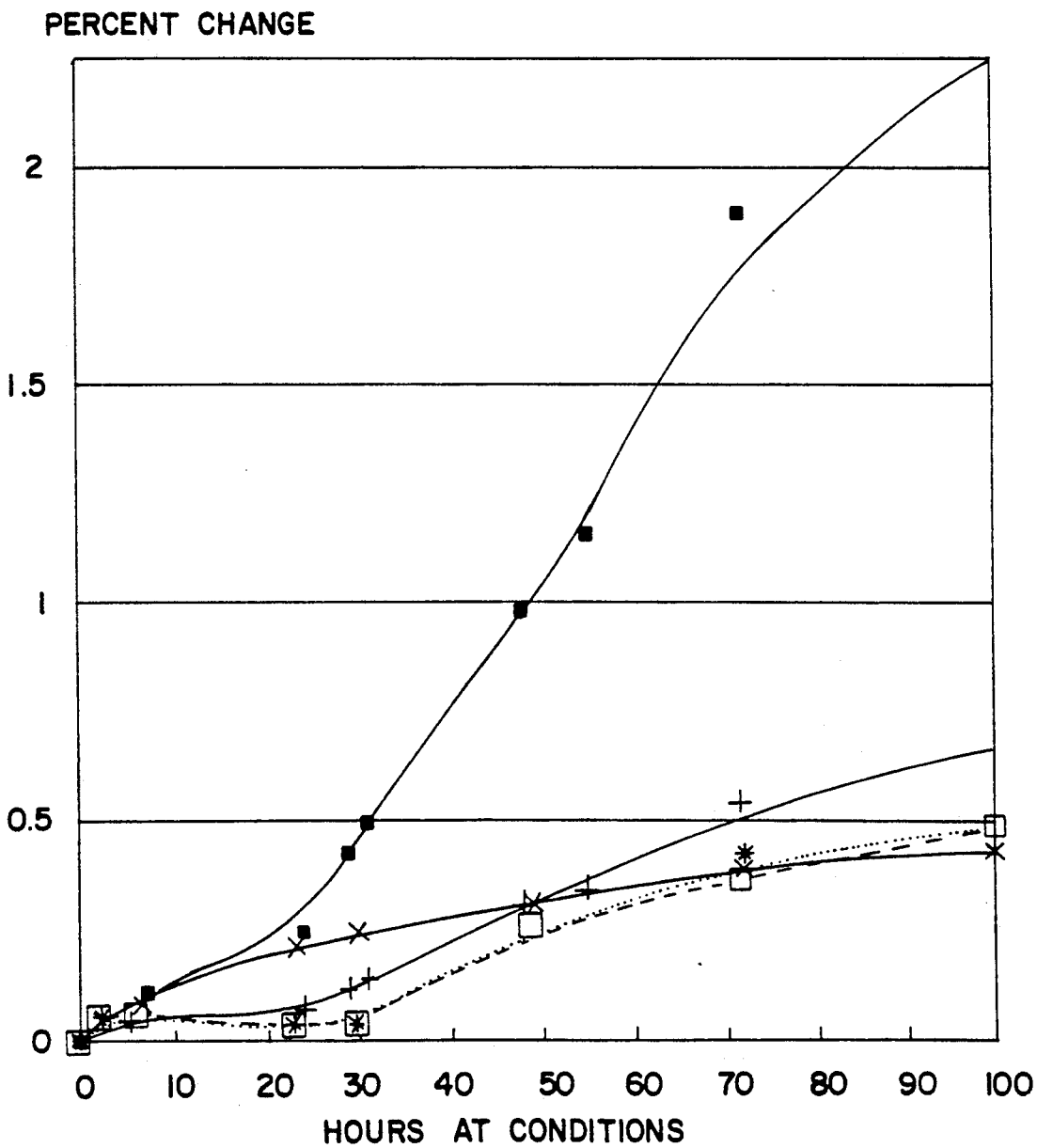

HARD COATED GUM WITH IMPROVED SHELF LIFE

FIELD OF THE INVENTION

The present invention relates to a hard-coated chewing gum having an extended shelf life. Specifically, the invention relates to a chewing gum coated with a syrup including hydrogenated isomaltulose having an improved center composition that facilitates a longer shelf life.

BACKGROUND OF THE INVENTION

Chewing gums, including pellet chewing gums, are frequently enclosed with hard or soft coatings. Coatings provide an opportunity for the manufacturer to vary product characteristics such as taste, appearance and nutritional value. In recent years, efforts have been devoted to producing sugarless hard coatings for use in chewing gum. Sugarless coatings which have been investigated include coatings containing compounds such as xylitol, sorbitol, mannitol, and hydrogenated starch hydrolysates.

U.S. Pat. No. 4,792,453, which is assigned to the same owner as the present application, discloses a chewing gum having a sugarless chewing gum center coated with a syrup containing hydrogenated isomaltulose. The sugarless center may include various substituents such as water, an insoluble gum base, a bulking agent, a softener, an artificial sweetener, and a flavoring agent. The sugarless chewing gum center of the reference has a water content of less than about 2.5 weight percent, preferably less than about 1.5 weight percent and most preferably less than about 1.0 weight percent. The use of a center having a low water content, is intended to prevent or reduce the tendency of the gum center from being a water donor to the hard coating.

Sugarless gums coated with hydrogenated isomaltulose-containing syrup possess excellent appearance, taste, texture, mouth feel, and other desirable properties of hard coated chewing gums. Also, it has been found that the relatively anhydrous gum center has the capability of pulling moisture from the hydrogenated isomaltulose-containing coating, causing the coating to exhibit superior hardness. This moisture-pulling from the gum center is attributable, in large part, to the use of glycerin as a softener in the gum center. The moisture-pulling effect is the most pronounced in hard coated chewing gums which contain moderate or relatively high amounts of glycerin in the chewing gum center, on the order of about 5 to about 15 percent by weight of the chewing gum center.

The tendency of glycerin to pull moisture from the hydrogenated isomaltulose-containing coating can operate as a disadvantage in certain pellet-shaped hard coated chewing gums which, due to their shape, are difficult to isolate from a moisture-containing environment by packaging. For example, pellet gum which is shaped like pillows is difficult to protect from moisture because it is difficult to form a good quality, low or non-moisture permeable package which is suitable for these pellets.

Hydrogenated isomaltulose is a monohydrate. If the hydrogenated isomaltulose-containing coating on the pellet gum becomes too dry, e.g. due to the presence of glycerin, the coating becomes more hygroscopic and begins to absorb moisture from the surrounding atmosphere. This continuous drying and absorption of moisture from the atmosphere, reduces the shelf life of the pellet gum by causing the coating to soften and lose its desirable texture, appearance and mouth feel. Thus, the coating itself must be sufficiently shelf stable against moisture absorption so as not to allow the coating to deteriorate during its shelf life.

SUMMARY OF THE INVENTION

The present invention is directed to a hard-coated chewing gum uniquely suitable for use in pellet chewing gum whose pellet shape does not lend itself to packaging of a type that would protect the pellets from the atmosphere. These pellets are subject to constant exposure to the atmosphere and atmospheric moisture during shelf storage. The present invention provides a hard-coated chewing gum which is shelf stable under these conditions.

The chewing gum of the invention includes a center portion and an outer coating. The outer coating contains hydrogenated isomaltulose, and preferably contains from about 50 to about 100 weight percent hydrogenated isomaltulose. The outer coating may also include whiteners, colorants, coating adjuvants and flavors. The outer coating constitutes about 10 to about 75 weight percent of the coated chewing gum product.

The gum center does not contain more than about 3 weight percent glycerin and preferably contains no glycerin. Also, the gum center contains more than about 2.5 weight percent water, with the water being preferably supplied by a liquid sorbitol solution component that preferably contains about 30 weight percent water. The gum center is preferably sugarless and preferably includes sorbitol, mannitol, xylitol, maltitol and/or hydrogenated starch hydrolyzate, and an aqueous sorbitol liquid. The gum center constitutes from about 25 to about 90 weight percent of the chewing gum product.

With the foregoing in mind, it is a feature and advantage of the invention to provide a hard coated chewing gum which retains its hardness, texture, appearance and mouth feel during shelf storage which involves constant exposure to the atmosphere.

It is also a feature and advantage of the invention to provide a hard coated shelf-stable chewing gum which does not absorb significant quantities of moisture from the atmosphere.

It is also a feature and advantage of the invention to provide a hard coated shelf-stable chewing gum which is uniquely suitable for pellet gum having pellet shapes which do not lend themselves readily to protective packaging with respect to the atmosphere.

It is also a feature and advantage of the invention to provide a method of making the improved hard coated shelf-stable chewing gum of the invention.

The foregoing and other features and advantages of the invention will become further apparent from the following detailed description of the presently preferred embodiments, read in conjunction with the accompanying examples and figure. The detailed description, examples and figure are to be construed as illustrative rather than limitative, with the scope of the invention being defined by the appended claims and equivalents thereof.

BRIEF DESCRIPTION OF THE FIGURE

FIG. 1 shows the weight gain as a function of time for various hard coated chewing samples, during storage at 85° F. and 70% relative humidity. The hard coated chewing gum samples are described in Examples 1–5 herein. The weight gain reflects the moisture absorption during storage, as a function of time.

DETAILED DESCRIPTION OF THE PRESENTLY PREFERRED EMBODIMENTS

In accordance with the invention, a hard coated chewing gum is provided which has a hard outer coating and a softer chewing gum center portion. The hard outer coating preferably constitutes about 10 to about 75 weight percent of the hard coated chewing gum, and most preferably constitutes about 20 to about 50 weight percent of the hard coated chewing gum. The softer chewing gum center portion preferably constitutes about 25 to about 90 weight percent of the hard coated chewing gum, and most preferably constitutes about 50 to about 80 weight percent of the hard coated chewing gum.

The hard outer coating include hydrogenated isomaltulose. The hard outer coating may be present as a single coating or as a plurality of layers. The hard coating may be present in any thickness or amount which is commercially acceptable. Preferably, the hard coating contains about 50 to about 100 weight percent hydrogenated isomaltulose, and most preferably greater than about 90 weight percent hydrogenated isomaltulose. The hard outer coating is applied as an aqueous syrup, and then dried, as will be hereinafter explained.

Hydrogenated isomaltulose, also known as isomalt, is a sugar substitute which can be used in place of sucrose, glucose or similar sugars for the production of food stuffs. Hydrogenated isomaltulose may be classified as a carbohydrate and, more specifically, a hydrogenated disaccharide. Hydrogenated isomaltulose is believed to be a superior sugarless sweetener in a gum hard coating because of its relatively high sweetening power, lack of aftertaste and synergistic capabilities when mixed with other sugar alcohols such as xylitol or sorbitol.

Hydrogenated isomaltulose is available from Palatinit GmbH under the trademark name palatinit. According to the manufacturer, the production of hydrogenated isomaltulose involves an enzymatic rearrangement of saccharose into a much more stable compound known as isomaltulose (trademark name palatinose). Following a purifying crystallization, the isomaltulose is hydrogenated to form the resulting palatinit compound. Specifically, palatinit is an equimolecular mixture of the isomers α-D-glucopyranosido-1,6-mannitol (GPM) and α-D-glucopyranosido-1,6-glucitol (GPG). Palatinit is described as an odorless, white, crystalline, nonhygroscopic substance containing about 5 percent water of crystallization.

The coating may also contain other components such as flavoring agents, artificial sweeteners and dispersing agents, coloring agents, film formers, and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be added to the coating syrup in an amount such that the coating will contain about 0.2 to about 1.2 weight percent flavoring agent and preferably about 0.7 to about 1.0 weight percent flavoring agent.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain about 0.05 to about 0.3 weight percent and preferably about 0.10 to about 0.15 weight percent artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain between about 0.1 to about 1.0 weight percent and preferably 0.3 to about 0.6 weight percent of the agent.

Coloring agents are preferably added directly to the syrup in the dye or lake form. Coloring agents contemplated by the present invention include food quality dyes. Film fommers preferably added to the syrup, include methyl cellulose, gelatins, hydroxypropyl cellulose, ethyl cellulose, hydroxyethyl cellulose, carboxmmethyl cellulose and the like and combinations thereof. Binding agents may be added either as an initial coating on the chewing gum center or may be added directly into the syrup. Binding agents contemplated by the present invention include gum arabic, alginate, cellulosics, vegetalle gums and the like.

The softer chewing gum center includes a water soluble bulk portion, a generally water insoluble chewing gum base and one or more flavoring agents. The water soluble portion dissipates over a period of time during chewing, while the gum base portion remains in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate, ester gums and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5–95% by weight of the chewing gum center, more typically 10–50% by weight of the chewing gum center, and most commonly 25–35% by weight of the chewing gum center.

The water soluble portion of the chewing gum center may include softeners, bulk sweeteners, high intensity sweeteners, flavoring agents and combinations thereof. Softeners are added to the chewing gum center in order to optimize the chewability and mouth feel of the gum.

The softeners, which are also known as plasticizers or plasticizing agents, constitute between about 8.5-15% by weight of the chewing gum center. The softeners may include no more than about 3.0% glycerin, by weight of the gum center, and preferably include no glycerin.

Aqueous sweetener solutions such as those containing sorbitol, hydrogenated starch hydrolysates, syrups of xylitol, maltitol, hydrogenated isomaltulose and other polyols, corn syrup and combinations thereof, are instead used as softeners and binding agents in the chewing gum center. The amount of aqueous sweetener employed must be sufficient to provide the chewing gum center with an overall moisture content of greater than 2.5% by weight of the chewing gum center. The preferred softener is an aqueous sorbitol solution containing about 70% by weight sorbitol and about 30% by weight water. The sorbitol solution is present in an amount of about 8.5 to about 15% by weight of the gum center, preferably about 10% by weight of the gum center.

Bulk sweeteners constitute between about 5-90% by weight of the chewing gum center, more typically about 20-80% by weight of the chewing gum center and most commonly about 30-60% by weight of the chewing gum center. Bulk sweeteners preferably include sugarless sweeteners and components. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, hydrogenated isomaltulose, and the like, alone or in combination.

High intensity sweeteners may also be present and are commonly used with sugarless sweeteners. When used, high intensity sweeteners typically constitute between 0.001-5% by weight of the chewing gum center, preferably between 0.01-1% by weight of the chewing gum center. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in the chewing gum center. The sweetener may also function in the chewing gum in whole or in part as a water soluble bulking agent. The softener may also provide additional sweetness.

The flavoring agent should generally be present in the chewing gum center in an amount within the range of about 0.1-15% by weight of the chewing gum center, preferably between about 0.2-5% by weight of the chewing gum center, most preferably between about 0.5-3% by weight of the chewing gum center. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the chewing gum center. Natural and artificial flavoring agents may be combined in any sensorially acceptable fashion.

Optional ingredients such as colors, emulsifiers, pharmaceutical agents and additional flavoring agents may also be included in chewing gum center.

The chewing gum center is generally manufactured by sequentially adding the various chewing gum ingredients to any commercially available mixer known in the art. After the ingredients have been thoroughly mixed, the gum mass is discharged from the mixer and shaped into the desired form such as by extruding into chunks, or casting into pellets.

Generally, the ingredients are mixed by first melting the gum base and adding it to the running mixer. The gum base may alternatively be melted in the mixer. Color and emulsifiers can be added at this time.

A softener such as liquid sorbitol solution can be added next along with syrup and part of the bulk portion. Further parts of the bulk portion may then be added to the mixer. The flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

After the chewing gum center has been manufactured and shaped, the hydrogenated isomaltulose-containing coating can be applied. The coating is initially present as a liquid syrup which contains about 30 to about 75 weight percent of the coating ingredients previously described herein, and about 25 to about 70 weight percent of a solvent such as water. In general, the hard coating process is carried out in a rotating pan. Sugarless gum center tablets to be coated are placed into the rotating pan to form a moving mass.

The material or syrup which will eventually form the hard coating, is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of about 100° F. to about 200° F. Preferably, the syrup temperature is between about 150° F. to about 170° F. Most preferably, the syrup temperature should be maintained at about 158° F. throughout the process in order to prevent the hydrogenated isomaltulose in the syrup from crystallizing. The syrup may be mixed with, sprayed upon, poured over, or added to the gum center tablets in any way known to those skilled in the art.

The gum center tablets may be coated with a single hard layer or a plurality of hard layers. In general, a plurality of layers is obtained by applying single coats, allowing the layers to dry, and then repeating the process. Any number of coats may be applied to the gum center tablet. Preferably, no more than about 75 coats are applied to the gum center tablets. More preferably, less than about 60 coats are applied and most preferably, between about 30 to about 60 coats are applied. In any event, the present invention contemplates applying an amount of syrup sufficient to yield a hard coated chewing gum product containing about 10 to about 75 weight percent coating. Preferably, the final product will contain between about 20 to about 50 weight percent coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure. In any event, the present invention contemplates applying a coat or plurality of coats sufficient to yield a product containing about 10 to 75 weight percent coating.

The present invention contemplates that the syrup preferably comprises between about 30 weight percent hydrogenated isomaltulose and its saturation point at coating temperatures. More preferably, the syrup will contain about 60 to about 75 weight percent hydrogenated isomaltulose. The syrup may comprise hydrogenated isomaltulose dissolved in water or any other food quality solvent in an amount sufficient to yield a hard coating comprising between about 50 to about 100 weight percent hydrogenated isomaltulose. More preferably, however, the syrup will comprise an amount of hydrogenated isomaltulose sufficient to yield a hard coating comprising greater than about 90 weight percent hydrogenated isomaltulose. Furthermore, the syrup and thus the coating may contain sugar substitutes other than hydrogenated isomaltulose such as sorbitol, mannitol and xylitol.

In addition, it is contemplated by the present invention that a flavoring agent may be added to the syrup, or applied to the gum center tablets while the syrup coating is drying or after the coating has dried. Furthermore, the flavoring agent may be applied after any sequence of coats, for example, the third, twelfth, eighteenth, etc. coat.

Once a coating of syrup is applied to the gum center tablets, the present invention contemplates drying the wet syrup in an inert medium. A preferred drying medium comprises air. Preferably, forced drying air contacts the wet syrup coating in a temperature range of about 80° to about 115° F. More preferably, the drying air is in the temperature range of about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate of about 2,800 cubic feet per minute. Furthermore, if a flavoring agent is applied after a syrup coating has been dried, the present invention contemplates drying the flavoring agent with or without the use of a drying medium.

A wide range of changes and modifications to the embodiments of the invention described above will be apparent to persons skilled in the art. The following examples are not to be construed as imposing limitations on the inventions, but are included merely to illustrate preferred embodiments.

EXAMPLES 1-5

Five chewing gum centers were made having the following compositions. The compositions are expressed as percent by weight of the chewing gum centers.

| COMPONENT | EXAMPLE 1 (Comparative) | EXAMPLE 2 | EXAMPLE 3 | EXAMPLE 4 | EXAMPLE 5 |
|---|---|---|---|---|---|
| Gum Base | 33.0 | 33.0 | 33.0 | 33.0 | 33.0 |
| Calcium Carbonate | 13.0 | — | 13.0 | 13.0 | 13.0 |
| Sorbitol | 44.06 | 43.76 | 28.93 | 41.88 | 28.72 |
| Mannitol | — | 8.3 | 13.0 | — | 13.0 |
| Glycerin | 8.0 | 3.0 | — | — | — |
| 70% Sorbitol Liquid | — | 10.0 | 10.0 | 10.0 | 10.0 |
| Peppermint Flavor | 1.80 | 1.80 | 1.80 | 1.80 | 1.80 |
| Encapsulated Aspartame | 0.14 | 0.14 | 0.12 | 0.12 | 0.18 |
| Lecithin | — | — | 0.15 | 0.20 | 0.30 |
| TOTAL | 100.0 | 100.0 | 100.0 | 100.0 | 100.0 |

The gum centers of Examples 1-4 were made in a laboratory using a two gallon Sigma blade mixer, using a mixing temperature of 120° F., a mixing time of 13 minutes, and blade speeds of 19 rpm for the fast blade and 11 rpm for slow blade. The gum center of Example 5 was made in a production scale Sigma blade mixer having a 150 gal. capacity, using a mixing temperature of 120° F., a mixing time of 10 min., and a blade speeds of 19 rpm for the fast blade and 11 rpm for the slow blade. The gum centers of Examples 1-4 were sheeted and cut into square shaped pellets using a laboratory pelletizer, while the gum center of Example 5 was pelletized into standard 1 05 gram pillow shaped pellets using production scale equipment.

Coating Of Gum Centers Of Examples 1 and 2

The gum centers of Examples 1 and 2 were coated using two laboratory-size twelve-inch diameter coating pans. Each sample of 1,000 grams was initially pelletized into square pellets of approximately 1.1 grams per pellet. For each Example, a hydrogenated isomaltulose syrup was prepared by mixing 350 grams of Palatinit with 130 grams of water, to yield a 73% solution. Then, each 1,000 gram sample of gum center was placed in a coating pan and coated with the hydrogenated isomaltulose syrup.

Enough hydrogenated isomaltulose coatings were added to yield about a 20% dry coating based on the weight of the total product. After about 10% coating had been obtained, three additions of peppermint flavor totalling 4.8 grams were added with the hydrogenated isomaltulose solutions to the chewing gum centers of each Example. In other words when a 20% coating had been achieved, the hard coated chewing gum of each Example contained a total of 1,000 grams chewing gum center, 250 grams of hydrogenated isomaltulose and 4.8 grams of peppermint flavor.

After a 20% hard coating had been obtained, a second syrup solution prepared from 300 grams of Palatinit and 200 grams of water (to yield a 60% solution) was used to further coat the chewing gums of both Examples. Enough of the 60% hydrogenated isomaltulose coatings were added to yield a total dry coating of 33% based on the weight of the total product. Each finished hard coated chewing gum consisted of pellets containing a total of 1,000 grams of chewing gum center and 500 grams of hard outer coating, the hard coating containing 495.2 grams of hydrogenated isomaltulose and 4.8 grams of peppermint flavor.

Coating Of Gum Centers Of Examples 3 and 4

The gum centers of Examples 3 and 4 were also coated using two laboratory-size twelve-inch diameter coating pans. Each sample of 1,000 grams was initially pelletized into square pellets of approximately 1.1 grams per pellet. For each Example, a coating syrup was prepared by mixing 650 grams of Palatinit, 4 grams of Acesulfame K sweetener, 3.5 grams of titanium dioxide whitener and 350 grams of water. The composition of the syrup was 64.52% hydrogenated isomaltulose, 0.40% Acesulfame K sweetener, 0.35% titanium dioxide whitener and 34.74% water.

Initially, enough coatings of the syrup were applied to the gum centers of Examples 3 and 4 to yield a 10% dry coating based on the weight of the total gum. Then, three additions of peppermint flavor totalling 4.8 grams, were added with subsequent syrup coatings. Enough additional coatings were added to the chewing gum to yield a 33% dry coating based on the weight of the total gum. Each finished hard coated chewing gum product consisted of pellets containing a total of 1,000 grams chewing gum center and 500 grams of hard outer coating, the hard coating containing 489.4 grams of hydrogenated isomaltulose, 4.8 grams of peppermint flavor, 3.1 grams of Acesulfame-K and 2.7 grams of titanium dioxide whitener.

Coating Of Gum Center Of Example 5

The coating of the gum center of Example 5 was accomplished in a 36-inch diameter production scale coating pan. Fifty kilograms of chewing gum center was initially cut into pillow-shaped pellets. A coating syrup was prepared by mixing 25.5 Kg of Palatinit, 335 grams of titanium dioxide whitener, 172 grams of Acesulfame K sweetener and 13.7 Kg of water. The composition of the syrup was 64.22% hydrogenated isomaltulose, 0.84% titanium dioxide whitener, 0.43% Acesulfame K sweetener and 34.50% water.

Initially, enough coatings of the syrup were applied to the gum center of Example 5 to yield a 10% dry coating based on the weight of the total gum. Then, three additions of peppermint flavor totalling 422 grams, were added with subsequent syrup coatings. Enough additional coatings were added to the chewing gum to yield a 34.5% dry coating based on the weight of the total gum. The finished hard coated chewing gum product consisted of pellets containing a total of 50 Kg of chewing gum center and 26.3 Kg of hard outer coating, the hard outer coating containing 25.4 Kg of hydrogenated isomaltulose, 422 grams of peppermint flavor, 335 grams of titanium dioxide whitener and 172 grams of Acesulfame K sweetener.

Testing Of Hard Coated Gum Samples

The hard coated chewing gums of Examples 1-5 were tested by placing five hard coated pellets from each Example into a dish, measuring the initial weight and placing the dishes into an environmental chamber at 85° F. and 70% relative humidity. The dishes were again weighed after 2, 6, 23, 30, 49, 72 and 100 hours of storage, and the weight changes of the pellets were determined. The results are plotted in FIG. 1.

As shown in FIG. 1, the hard coated gum of comparative Example 1, containing 8.0% glycerin by weight of the chewing gum center, and no liquid sorbitol solution, showed by far the greatest increase in weight. The weight increase for the hard coated gum of Example I was about 2.4 percent after 100 hours.

The hard coated gum of Example 2, containing 3.0% glycerin and 10% liquid sorbitol by weight of the chewing gum center, showed the second highest increase in weight. The weight increase for Example 2 was nevertheless only about 0.7 percent after 100 hours, much lower than for Example 1.

The hard coated gums of Examples 3-5 contained no glycerin, and each contained 10% liquid sorbitol by weight of the chewing gum center. These samples exhibited the smallest increases in weight. The weight increase for each of Examples 3-5 was less than 0.5% after 100 hours.

From these Examples and tests, it was concluded that hard coated chewing gum using 70% aqueous sorbitol solution as a softener for the center portion, absorbs considerably less moisture from the atmosphere than hard coated chewing gum using glycerin as a softener. Accordingly, the hard coated chewing gums of the invention are believed to be especially suitable for hard coated pellet gums having pellet shapes which are difficult to package in a fashion which protects the pellets from the atmosphere. Pellet gums made using the hard coated gum of the invention are shelf stable for relatively long periods of time, notwithstanding their constant exposure to the atmosphere.

While the embodiments of the invention disclosed herein are presently considered to be preferred, various modifications and changes can be made without departing from the spirit and scope of the invention. The scope of the invention is indicated in the appended claims, and all changes which come within the meaning and range of equivalency of the claims are intended to be embraced therein.

We claim:

1. A hard coated chewing gum, comprising:
    about 25-90 weight percent of a chewing gum center including 5-90 percent of a bulk sweetener, 5-95 percent of a chewing gum base, 0.1-15 percent of one or more flavoring agents, and 8.5-15 percent of a softener, by weight of the gum center; and
    about 10-75 weight percent of a hard outer coating including hydrogenated isomaltulose;
    the softener comprising an aqueous sweetener solution;
    the gum center including at least 2.5 percent water by weight of the gum center and not more than about 3.0 percent glycerin by weight of the gum center.

2. The hard coated chewing gum of claim 1, wherein the softener comprises an aqueous sorbitol solution.

3. The hard coated chewing gum of claim 2, wherein the aqueous sorbitol solution comprises about 70 weight percent sorbitol and about 30 weight percent water.

4. The hard coated chewing gum of claim 1, wherein the softener constitutes about 10 weight percent of the gum center.

5. The hard coated chewing gum of claim 1, wherein the gum base includes an elastomer selected from the group consisting of polyisobutylene, isobutylene-isoprene copolymer, styrene butadiene rubber, natural latexes, and combinations thereof.

6. The hard coated chewing gum of claim 1, wherein the gum base includes a resin selected from the group consisting of polyvinyl acetate, terpene resins, ester gums, and combinations thereof.

7. The hard coated chewing gum of claim 1, wherein the gum base includes fats and oils selected from the group consisting of animal fats, vegetable oils, hydrogenated vegetable oils, partially hydrogenated vegetable oils, cocoa butter, and combinations thereof.

8. The hard coated chewing gum of claim 1, wherein the gum base includes a wax selected from the group consisting of paraffin wax, microcrystalline wax, candelilla, carnauba, polyethylene wax, and combinations thereof.

9. The hard coated chewing gum of claim 1, wherein the gum base includes a filler component selected from the group consisting of calcium carbonate, magnesium carbonate, talc, dicalcium phosphate, and combinations thereof.

10. The hard coated chewing gum of claim 1, wherein the gum base includes a softener selected from the group consisting of glycerol monostearate, glycerol triacetate, and combinations thereof.

11. The hard coated chewing gum of claim 1, wherein the outer coating comprises from about 50 to about 100% hydrogenated isomaltulose by weight of the outer coating.

12. The hard coated chewing gum of claim 1, wherein the outer coating comprises at least about 90% hydrogenated isomaltulose by weight of the outer coating.

13. A hard coated chewing gum, comprising:
about 25 to about 90 weight percent of a gum center which includes 5-95 percent of a gum base, 5-90 percent of a bulk sweetener, 0.1-15 percent of one ore more flavoring agents, and 8.5-15 percent of a softener, by weight of the gum center; and
about 10 to about 75 weight percent of a hard outer coating which includes about 50 to about 100 percent hydrogenated isomaltulose by weight of the outer coating;
the gum center including at least 2.5 percent water by weight of the gum center, and not more than about 3.0 percent glycerin by weight of the gum center.

14. The hard coated chewing gum of claim 13, wherein the softener comprises a mixture of water and a sweetener selected from the group consisting of sorbitol, hydrogenated starch hydrolysates, syrups of xylitol, maltitol, hydrogenated isomaltulose and other polyols, corn syrup, and combinations thereof.

15. The hard coated chewing gum of claim 13, wherein the softener comprises a mixture of water and sorbitol.

16. The hard coated chewing gum of claim 13, wherein the gum center includes a bulk sweetener selected from the group consisting of sorbitol, mannitol, xylitol, hydrogenated starch hydrolysates, maltitol, hydrogenated isomaltulose, and combinations thereof.

17. The hard coated chewing gum of claim 13, wherein the gum center further includes a high intensity sweetener selected from the group consisting of sucralose, aspartame, salts of acesulfame, alitame, saccharin and its salts, cyclamic acid and its salts, glycyrrhizin, dihydrochacones, thaumatin, monellin, and combinations thereof.

18. The hard coated chewing gum of claim 13, wherein the gum center constitutes about 50 to about 80 weight percent of the hard coated chewing gum and the outer coating constitutes about 20 to about 50 weight percent of the hard coated chewing gum.

19. The hard coated chewing gum of claim 13, wherein the hard outer coating includes at least about 90% hydrogenated isomaltulose by weight of the outer coating.

20. The hard coated chewing gum of claim 13, wherein the gum center contains no glycerin.

21. A method of forming a hard coated chewing gum, comprising the steps of:
forming a gum center including 5-90 percent of a bulk sweetener, 5-95 percent of a chewing gum base, 0.1-15 percent of one or more flavoring agents, and 8.5-15 percent of a softener, by weight of the gum center, the gum center containing at least 2.5 percent water by weight of the gum center and not more than 3.0 percent glycerin by weight of the gum center;
forming a liquid coating syrup comprising hydrogenated isomaltulose and about 25 to about 70 percent solvent by weight of the coating syrup;
applying the liquid coating syrup to the gum center; and
evaporating the solvent from the liquid coating syrup.

22. The method of claim 21, wherein the solvent for the liquid coating syrup comprises water.

23. The method of claim 21, wherein the liquid coating syrup comprises at least about 30% hydrogenated isomaltulose by weight of the liquid coating syrup.

24. The method of claim 21, wherein the liquid coating syrup further comprises a flavoring agent.

25. The method of claim 21, wherein the liquid coating syrup further comprises a whitener.

26. The method of claim 21, wherein the liquid coating syrup further comprises an artificial sweetener.

27. The method of claim 21, wherein the liquid coating syrup is applied to the chewing gum center by spraying.

28. The method of claim 21, further comprising the steps of applying a plurality of coatings of liquid syrup to the gum center, and drying the plurality of coatings.

* * * * *

UNITED STATES PATENT AND TRADEMARK OFFICE
CERTIFICATE OF CORRECTION

PATENT NO.   : 5,248,508
DATED        : September 28, 1993
INVENTOR(S)  : Michael A. Reed It is certified that error appears in the above-indentified patent and that said Letters Patent is hereby corrected as shown below:

In column 4, line 23, delete "fommers" and insert --formers--.

In column 8, line 27, delete the second occurrence of "a".

In column 8, line 32, delete "1 05" and insert --1.05--.

Column 11, line 30, claim 13, delete "ore" and insert --or--.

Column 12, line 6, claim 17, delete "dihydrochacones" and insert --dihydrochalcones--.

Signed and Sealed this

Twenty-fifth Day of October, 1994

Attest:

BRUCE LEHMAN

*Attesting Officer*   *Commissioner of Patents and Trademarks*